C. P. ALLEN.
AUXILIARY DRIVE FOR AUTOMOBILES.
APPLICATION FILED OCT. 2, 1913.
1,117,621.
Patented Nov. 17, 1914.
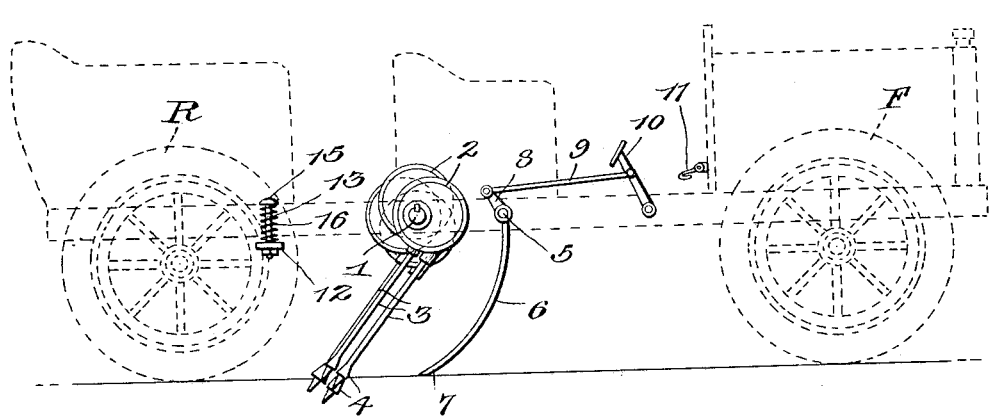
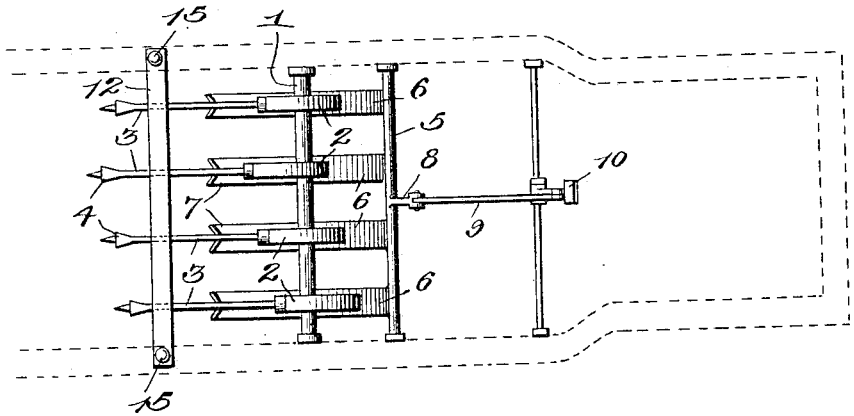
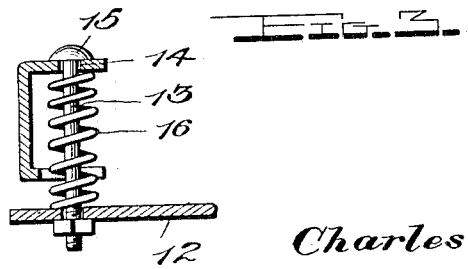
Inventor
Charles P. Allen,
Witnesses

UNITED STATES PATENT OFFICE.

CHARLES P. ALLEN, OF HOTCHKISS, COLORADO.

AUXILIARY DRIVE FOR AUTOMOBILES.

1,117,621.     Specification of Letters Patent.     Patented Nov. 17, 1914.

Application filed October 2, 1913. Serial No. 793,006.

*To all whom it may concern:*

Be it known that I, CHARLES P. ALLEN, a citizen of the United States, residing at Hotchkiss, in the county of Delta and State of Colorado, have invented certain new and useful Improvements in Auxiliary Drives for Automobiles; and I do declare the following to be a full, clear, and exact description of the invention, such as will enable others skilled in the art to which it appertains to make and use the same.

This invention relates to motor vehicles, and more especially to steppers for assisting in driving the same or for starting the same when they have become stuck; and the object of the invention is to produce improved means for lifting the stepper legs so that their feet will be off the ground. This and other objects are accomplished by constructing the invention in the manner hereinafter more fully described and claimed, and as shown in the drawings wherein—

Figure 1 is a side elevation of this device complete, applied to an automobile which latter is shown in dotted lines; Fig. 2 is a plan view of the same with the parts in a different position; and Fig. 3 is an enlarged sectional detail of the support for the anti-rattler bar.

The automobile conventionally and diagrammatically illustrated in some of the views needs no description, excepting that its front wheels are designated by the letter F and its rear wheels by the letter R. These machines are run over all kinds of roads and in all kinds of seasons, and it sometimes occurs that they become stalled in a muddy place on the road or in the snow or ice. They differ from horse-driven vehicles in that they are propelled by the mechanical rotation of certain of their wheels, and if the tires slip on or in the surface or if the load is so heavy that to start out of a rut or up a steep hill might tear the tires, auxiliary driving mechanism is desirable. This mechanism is shown in the accompanying drawings as consisting of a shaft 1 disposed across the frame between the wheels and connected in any suitable manner with the drive shaft of the automobile, a series of cranks or eccentrics 2 on said shaft, a series of legs 3 whose ends are connected with said cranks or eccentrics, and feet 4 at the lower ends of said legs. When the shaft 1 is thrown into connection with the drive shaft of the automobile, whether the latter be cut off from the driving axle or not, the cranks or eccentrics 2 draw the legs 3 forward and then push them rearward and downward so that the feet 4 are caused to "step" the machine along out of the soft place or away from the icy place in the road, and thereafter the power may be thrown onto the rear axle and the machine can be driven as usual. It then becomes desirable to raise the stepper so that the feet 4 do not trail on the ground.

Coming now more particularly to the details of the present invention, I provide a rock shaft 5 mounted in suitable hangers beneath the frame of the machine, and from it forks 6 project to the rear, one beneath each leg 3, and the rear ends or tines 7 of the fork are adapted to engage said leg when the forks are raised. They are so raised by rocking the shaft 5, and while any suitable means may be employed for rocking it, I prefer to provide it with an upstanding arm 8 and connect said arm by a link 9 with a lever 10, herein shown as a foot lever mounted adjacent the driver's seat and adapted to be engaged with a catch or hook 11 when thrown forward. In this position the arm 8 causes the shaft 5 to be turned in its bearings so that the several forks are raised and their tines sustain the stepper-legs 3 in elevated and inoperative position. When now it is desired to throw this stepper into use, the lever is disengaged from the hook or catch 11, and the entire group of forks permitted to descend, when obviously the weight of the legs 3 will cause them to drop so that their feet 4 engage the ground and the operation above described may take place. I do not wish to be limited to the proportions or materials of parts, and changes in details may be made without sacrificing the principle of the invention. For preventing the rattling of parts when this mechanism is thrown out of active position, I preferably disposed a cross bar 12 across and beneath the automobile framework and in position where the legs 3 will strike the same when they are raised. From this cross bar rise pins 13 slidably engaging eyes or holes in the framework as indicated at 14, and headed at their upper extremities as at 15 to prevent the bar from falling out of place; and around these pins are placed coiled expansive springs 16 bearing the cross bar normally downward. When now the lever mechanism and forks are moved to raise the stepping mechanism, the legs of the latter are borne upward against said cross bar with a certain amount of yielding force if the forks themselves are of resilient material, and the group of legs is held downward by the resiliency of the springs which depress said cross bar. I prefer to employ this refinement where the attachment is applied to a high-grade automobile or a passenger vehicle, although obviously it could be omitted if the attachment were applied to a truck.

What is claimed as new is:

1. The combination with the frame of a vehicle, a transverse shaft mounted for rotation thereon, a plurality of eccentrics carried on said shaft, and a series of ground engaging members connected at their upper ends with said eccentrics; of a rock shaft also mounted on said frame forward of the first mentioned shaft, a plurality of arcuate arms carried on the last mentioned shaft and depending therefrom, said arms being respectively alined with the ground engaging members and having the free ends thereof forked for the reception therein of the latter when said arms are raised, and means mounted on the frame in connection with said rock shaft for actuating the latter and correspondingly raising said arms.

2. The combination with the frame of a vehicle, a shaft mounted for rotation thereon, a plurality of eccentrics mounted on the shaft in spaced relation to one another, and a series of ground engaging members connected at their upper ends with said eccentrics; of means mounted on the frame for elevating said ground engaging members to dispose the same to their inoperative positions, and yielding means also mounted on the frame adapted to be engaged by said ground engaging members when the latter are elevated.

3. The combination with the frame of a vehicle, a shaft mounted for rotation thereon, a plurality of eccentrics mounted in spaced relation to one another on said shaft and a series of ground engaging members connected at their upper ends with said eccentrics and depending therefrom; of means also mounted on the frame for elevating said ground engaging members and disposing the same to their inoperative positions, and a transverse bar yieldingly suspended from the frame and adapted to be engaged by the outer ends of said ground engaging members when the latter are elevated, whereby to prevent rattling of said members at such time.

4. The combination with an automobile, a cross shaft thereon, a series of eccentrics fast on said shaft, a series of legs connected at their upper ends with said eccentrics, and feet at their lower ends; of a rock shaft journaled in bearings across the framework forward of said other shaft, a series of forks projecting downward and rearward from said rock shaft and having their tines disposed in position to engage said legs, a spring-pressed bar disposed above said legs and against which they are borne by the forks, and manually-controlled means for elevating the rear ends of said forks.

In testimony whereof I have hereunto set my hand in presence of two subscribing witnesses.

CHARLES P. ALLEN.

Witnesses:
T. H. LEWIS,
L. W. MORGAN.

Copies of this patent may be obtained for five cents each, by addressing the "Commissioner of Patents, Washington, D. C."